(No Model.)

J. W. BRYAN.
COMBINED CAR AND BRAKE PIPE COUPLING.

No. 588,052. Patented Aug. 10, 1897.

WITNESSES:
M. B. Blondel
P. B. Turpin

INVENTOR
John W. Bryan.
BY Munn & Co.
ATTORNEYS.

United States Patent Office.

JOHN WILLIE BRYAN, OF QUINCY, NORTH CAROLINA, ASSIGNOR OF ONE-HALF TO WAYNE B. VENTERS, OF RICHLANDS, NORTH CAROLINA.

COMBINED CAR AND BRAKE-PIPE COUPLING.

SPECIFICATION forming part of Letters Patent No. 588,052, dated August 10, 1897.

Application filed May 11, 1897. Serial No. 636,115. (No model.)

*To all whom it may concern:*

Be it known that I, JOHN WILLIE BRYAN, residing at Quincy, in the county of Onslow and State of North Carolina, have invented a new and useful Improvement in a Combined Car-Coupling and Brake-Pipe Coupling, of which the following is a specification.

My invention is an improved coupling for cars, which is so constructed that it also establishes communication between the brake pipe or pipes of the adjoining cars when the same are coupled; and the invention consists in certain novel constructions and combinations of parts, as will be hereinafter described, and pointed out in the claims.

Figure 1:
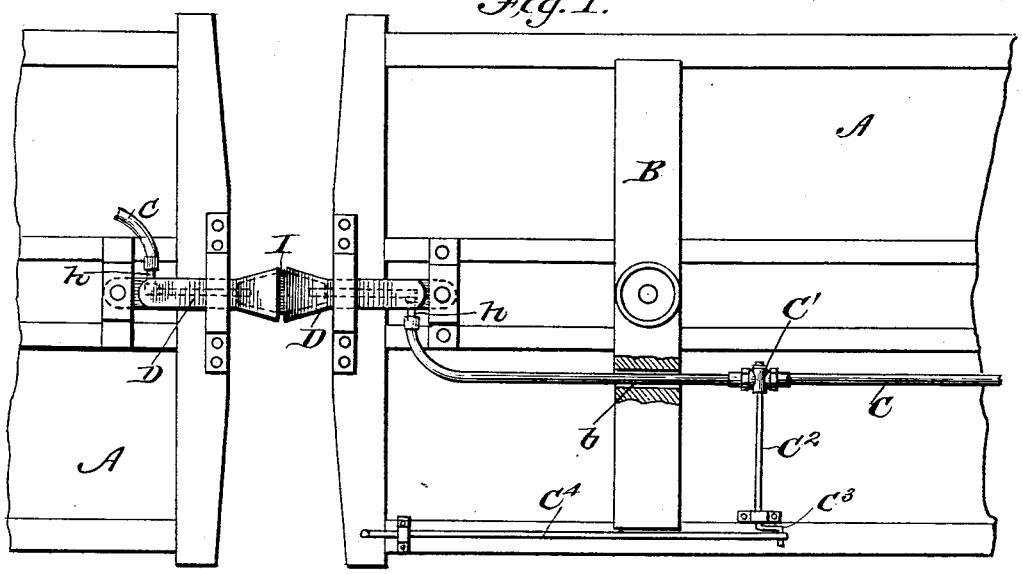
Figure 2:
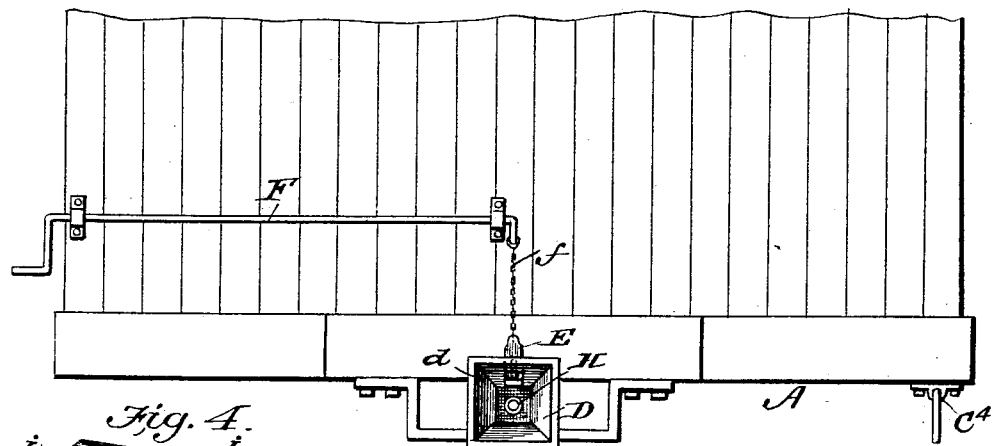
Figures 3, 4:
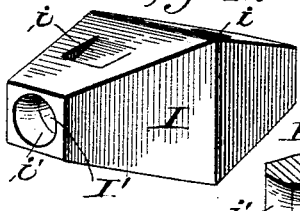

In the drawings, Figure 1 is a bottom plan view of the meeting ends of two cars coupled according to my invention, the trucks being removed and parts broken away to show the passage of the brake-pipe through the cross-beam of the car-frame. Fig. 2 is an end view of my coupling. Fig. 3 is a longitudinal section of the draw-head, the coupling-link or draw-bar, and the pin-bar for securing the same; and Fig. 4 is a detail perspective view of the coupling-link or draw-bar.

The car A has a cross-beam B, which is provided with an opening $b$ extended through it in the direction of length of the car. The brake-pipe C extends through this opening and is provided with a controlling-valve $C'$, which in the construction shown is connected with a shaft $C^2$, having a crank $C^3$, to which is connected a slide-rod $C^4$, extending to the end of the car, so the valve may be operated to set or release the brakes from the end of the car.

The draw-head D is provided with a mortise $d$ for the coupling-link or draw-bar, and is provided in its top wall with an opening $d'$, through which the pin-bar E works into and out of engagement with the draw-bar. This pin-bar E drops by gravity into coupled position and may be released by the crank-shaft F, connected with said pin-bar by the chain $f$. The motion of this pin-bar is limited by a cross-pin G, passing through a slot $e$ in the pin-bar, the draw-head being thickened at $g$ to properly support the said cross-pin G, as best shown in Fig. 3. The mortise $d$ of the draw-head is tapered or flared, as shown in Fig. 3, and is provided with a pipe or tube connection H, extending into said mortise from its rear end. This pipe connection H communicates with a lateral pipe connection $h$ near the rear end of the draw-head, and the brake-pipe connects with this lateral pipe connection or branch, as shown in Fig. 1. In Fig. 3 I have shown the pipe or tube connection H as extended back through the draw-head and communicating directly with the part $h$; but, if desired, the communication may be established through a suitable channel formed in the draw-head, as will be readily understood. The coupling-link or draw-bar I is made in the form of a block which is thickest at its middle and tapers thence to its opposite ends, being adapted to fit in the mortise of the draw-head, as shown in Fig. 3. By this form I make the draw-bar strongest at its middle portion, where it is not braced by the draw-heads. In its upper side the draw-bar I is notched at $i$, forming seats for the pin-bar E, and the latter is beveled at its lower end $E'$, so the coupling may be automatically effected. I establish the brake-pipe connections through this link or draw-bar preferably by the particular means shown, in which the draw-bar is provided with a longitudinal channel $I'$, which fits at its ends on the tube connections H when the coupling is effected, and thus establishes communication between the brake-pipes of the coupled cars. The channel $I'$ is flared at $i'$ to properly guide the pipe connection H into the channel $I'$, as will be understood from Fig. 3.

While I have shown but a single brake-pipe in Fig. 1, it will be understood that where two or more brake-pipes or a brake-pipe and a signal-pipe are employed their use would involve but a duplication of the channel $I'$ and parts H and $h$, before described.

By my invention I provide a coupling which automatically couples both the cars and the brake-pipe without any such complications as might affect the practicable working of the several parts.

Having thus described my invention, what I claim, and desire to secure by Letters Patent, is—

1. A coupling comprising the draw-heads having mortises, a tube end extending into each mortise, connections between said tubes and the fluid-pipes, a draw-bar formed of a block tapering from its middle toward each end and arranged to fit into the mortises of the draw-heads, said draw-bar having a longitudinal channel joining at its ends with the said tube ends, and notches along its upper side, the draw-heads having thickened portions, and pin-bars arranged to be held in the thickened portions of the draw-heads and engaged by said notches, substantially as described.

2. A coupling, comprising the draw-heads having tapered mortises and provided with pipe connections extended at their ends into said mortises, the draw-bar formed of a block thickest at the middle and tapering thence toward its opposite ends and arranged at such ends to fit in the tapered mortises of the draw-head, such draw-bar, having a longitudinal channel joining at its ends with the pipe connections and establishing communication between the pipes of the adjacent cars, and means for securing the draw-bar in the draw-head, substantially as described.

3. A coupling comprising the mortised draw-head, the draw-bar formed of a block tapering from its middle toward its ends, said draw-bar being fitted to the draw-head and notched in its upper side, the pin-bar sliding through the draw-head and engaging the notch of the draw-bar, said pin-bar being slotted longitudinally, a pin held to the draw-head and operating in the pin-bar slot and means for operating the pin-bar, substantially as described.

4. The improved coupling herein described, consisting of the draw-head having a tapered mortise, having the upper wall of said mortise thickened at $g$ and provided with an opening through said thickened portion, the pin-bar operating in said opening and provided with a slot, a cross-pin passsing through the thickened portion of the draw-head, and through said slot in the pin-bar, the crank-shaft for operating the pin-bar, the pipe connection or tube end extending into the draw-head from the rear end thereof, the tube end at or near the rear end of the draw-head, the brake-pipe connected with said tube end and the draw-bar made thickest at its middle, tapered thence toward its opposite ends and fitted to the tapered mortise of the draw-head, and provided with a longitudinal channel by which to establish communication between the tube ends of the meeting draw-heads, said draw-bar being notched in its upper side forming seats for the pin-bar, substantially as described.

JOHN WILLIE BRYAN.

Witnesses:
F. D. KOONCE,
S. B. TAYLOR.